(12) United States Patent
Sangle-Ferriere (10) Patent No.: US 12,093,437 B2
(45) Date of Patent: Sep. 17, 2024

(54) METHOD FOR AUTOMATICALLY PROTECTING AN OBJECT, A PERSON OR AN ITEM OF INFORMATION OR VISUAL WORK FROM A RISK OF UNWANTED VIEWING

(71) Applicant: Bruno Sangle-Ferriere, Paris (FR)

(72) Inventor: Bruno Sangle-Ferriere, Paris (FR)

( * ) Notice: Subject to any disclaimer, the term of this patent is extended or adjusted under 35 U.S.C. 154(b) by 519 days.

(21) Appl. No.: 17/344,397

(22) Filed: Jun. 10, 2021

(65) Prior Publication Data

US 2021/0390215 A1 Dec. 16, 2021

(30) Foreign Application Priority Data

Jun. 11, 2020 (FR) ...................................... 2006117

(51) Int. Cl.
| | | |
|---|---|---|
| *G06F 21/84* | (2013.01) | |
| *G06F 21/83* | (2013.01) | |
| *G06T 7/70* | (2017.01) | |
| *G06V 20/52* | (2022.01) | |

(52) U.S. Cl.
CPC .............. *G06F 21/84* (2013.01); *G06F 21/83* (2013.01); *G06T 7/70* (2017.01); *G06V 20/52* (2022.01); *G06T 2207/30196* (2013.01); *G06T 2207/30242* (2013.01)

(58) Field of Classification Search
None
See application file for complete search history.

(56) References Cited

U.S. PATENT DOCUMENTS

| | | |
|---|---|---|
| 6,665,079 B1 | 12/2003 | Tocci et al. |
| 7,686,463 B2 | 3/2010 | Goto |
| 9,677,327 B1 | 6/2017 | Nagel et al. |
| 2007/0150827 A1 | 6/2007 | Singh et al. |

(Continued)

FOREIGN PATENT DOCUMENTS

| | | |
|---|---|---|
| EP | 3002710 A1 | 4/2016 |
| JP | 2002156464 A | 5/2002 |

(Continued)

OTHER PUBLICATIONS

French Search Report corresponding to French Application No. 2006117 dated Apr. 14, 2021, 2 pages.

(Continued)

*Primary Examiner* — Syed A Roni
(74) *Attorney, Agent, or Firm* — Ronald M. Kachmarik; Cooper Legal Group LLC (57) ABSTRACT

Method for automatically protecting an object, a person, or an item of visual information from a risk of unwanted viewing by a third party, an unauthorized person and/or an image-recording device. The method includes the steps of: automatically detecting, by analyzing images from at least one Light Detection and Ranging (LIDAR) or from a camera arranged so as to cover a predefined surveillance area, the presence of a third party or of an unauthorized person and/or of the device in this area or nearby, the predefined surveillance area corresponding at least to an area from which the person or the device is capable of viewing the object, the person or the information, and in the event of positive detection, triggering a predefined action.

14 Claims, 3 Drawing Sheets

(56) References Cited

U.S. PATENT DOCUMENTS

| | | | |
|---|---|---|---|
| 2010/0053359 A1* | 3/2010 | Mooradian | G06V 10/60 |
| | | | 348/370 |
| 2014/0078164 A1* | 3/2014 | Chan | H04N 5/33 |
| | | | 345/589 |
| 2018/0203412 A1 | 7/2018 | Kline et al. | |

FOREIGN PATENT DOCUMENTS

| | | | |
|---|---|---|---|
| WO | 2011036414 A1 | 3/2011 | |
| WO | 2014164257 A1 | 10/2014 | |

OTHER PUBLICATIONS

International Search Report and Written Opinion from Corresponding International Application No. PCT/EP2021/065674, dated Sep. 7, 2021, 7 pages.

* cited by examiner

METHOD FOR AUTOMATICALLY PROTECTING AN OBJECT, A PERSON OR AN ITEM OF INFORMATION OR VISUAL WORK FROM A RISK OF UNWANTED VIEWING

PRIOR ART

The present invention relates to the confidentiality of what is displayed on screen and/or entered data on electronic devices, and more generally to the prevention of unwanted viewing of an object, of a person, of an action or of an item of visual information.

Privacy filters that limit the viewing angle of a screen are known, as described in U.S. Pat. No. 7,686,463 B2.

Additionally, keyboards for entering secret codes are often equipped with covers that aim to hide them from prying eyes.

Other means are known for maintaining the confidentiality of what is displayed on a screen. Application US 2018203412 discloses a method for generating a holographic masking surface for masking the content displayed on a device when the gaze of an unauthorized person is detected.

Application US20070150827 describes a method for identifying a viewing position of a person other than a user with respect to information on an interface and performing an action associated with the user interface based on the viewing position thus identified.

Unfortunately, the security afforded by these means which aim to prevent the viewing of information by an unauthorized person can be circumvented through the use of hidden cameras of small size which may be concealed in the environment around the information to be protected. Moreover, these means provide only limited protection with respect to the risk of viewing by an observant third party passing close by the user.

In addition, there is a need to prevent the use of image-recording and/or -transmission devices, in particular photographic devices, in certain locations such as museums, or to protect against unauthorized image capture during events or cinema screenings, or of celebrities located in a vehicle.

At present, personnel are generally responsible for performing this function, but the human means used are often inadequate or expensive when it comes to providing effective control.

DISCLOSURE OF THE INVENTION

There is therefore a need to remedy this situation.

SUMMARY OF THE INVENTION

The invention addresses this need by providing a method for automatically protecting an object, a person, an action or an item of visual information from a risk of unwanted viewing of this object, person, action or information by a third party, an unauthorized person and/or an image-recording and/or -transmission device, this method comprising the steps of:
  automatically detecting, by analyzing images from at least one lidar (Light Detection and Ranging) or from a camera arranged so as to cover a predefined surveillance area, the presence of a third party or of an unauthorized person and/or of said recording and/or transmission device in this area or nearby, the predefined surveillance area corresponding at least to an area from which the person or said recording and/or transmission device is capable of viewing the object, the person, the action or said information,
  in the event of positive detection, triggering a predefined action that aims to prevent said viewing, in particular that automatically prevents said viewing, in particular a predefined action on the object and/or on the information, and/or to warn a user thereof.

The invention allows active, effective and discrete protection of a displayed item of content or entered data. The user no longer has to worry about being watched, since the system monitors this for them, and they may thus focus on other tasks. The risk of information leakage or pirating is decreased. In addition, the invention may be implemented at low cost in many cases, since much of the hardware to be protected, such as laptop or tablet computers or payment terminals, already has a camera and computing means that are powerful enough to allow image analysis.

The invention also makes it possible to protect an object such as a work of art in a museum, by generating an alert if an image-recording and/or -transmission device is detected in the field of view of the work and/or by masking the object behind a glazing that can be opacified on demand, such as an electrochromic glazing.

The invention additionally makes it possible to protect the entering of a secret code, for example by interrupting the displaying of a keypad on a screen which is being used to input the code in the event of an unauthorized recording device or third-party viewer.

Similarly, a VIP present in a vehicle equipped with electrochromic glazing may be protected from image capture if an image-recording and/or -transmission device is detected by opacifying the glazing of the vehicle behind which the person is situated.

Thus, the predefined action of the method according to the invention may comprise an order to opacify an electrochromic glazing behind which the object or the person to be protected is positioned, and through which the object or the person to be protected may be viewed from the surveillance area.

Extent of the Surveillance Area

The object, the person, the work or the information may be viewable over a given viewing field and the predefined surveillance area then preferably covers a wider field.

Thus, the surveillance area may be dimensioned so as to make it possible to control a viewing angle that is wider than that over which the protected information may be seen, such that the warning or the action on the displaying of the protected information may be triggered before, for example, an ill-intentioned camera or a third party is able to view the protected information.

Optical Detection

Optical detection may be provided by one or more cameras or lidars allowing the surveillance area to be viewed. The detection may comprise illumination at visible and/or infrared wavelengths, allowing the use of the one or more detection cameras and/or the objectives of the one or more potentially hidden image-recording and/or -transmission devices to be made to glint. The or each camera may be fixed relative to the screen, being, for example, one or more webcams integrated into the screen. The one or more cameras being fixed with respect to the screen may help in determining the orientation to be conferred thereon in order to escape prying eyes; for example, an alert may be generated to indicate to the user that the orientation of the screen allows the displayed content to be viewed by a third party situated in the user's surroundings; the user may then determine the orientation to be conferred on the screen in order to remove it from the field of view of the third party, making use, for example, of an indication given in real time by the system following analysis of the field seen by the one or more cameras which have been turned along with the screen.

The field of view of the information to be protected is advantageously deliberately decreased by an optical method and/or by a mask. The screen is thus preferably equipped with a privacy filter that decreases the field of view of the content displayed on the screen, and therefore the extent of the area to be monitored.

The illumination, in particular infrared illumination, may be produced at different angles and/or at different wavelengths, and the one or more cameras used may view at these different wavelengths and different angles. When a plurality of cameras or light sources are used, they may be spaced sufficiently far apart from one another, for example be spaced apart from one another by at least one meter, so as to capture the reflections of light that are given at various angles. The antireflective coatings of objectives are sensitive to the angles of incidence of the light and viewing under such conditions may facilitate detection thereof. Similarly, these coatings may absorb at different infrared wavelengths, and may be easier to detect at some wavelengths than others.

Where applicable, a plurality of cameras or lidars carrying out detection and belonging to different systems are placed in a network so as to benefit from an expanded surveillance area for each item of hardware protected, and from the illumination provided by the other hardware.

When it is sought to display information only intended for one or more individuals, it is possible to ensure that only the one or more individuals that are able to receive the information are present in the surveillance area. It is thus possible to identify these one or more individuals, and in particular check that they are indeed real people and not decoys, and to check that they are not accompanied by unauthorized individuals. To prevent false positives, it may also be advantageous to check, in the event of detection of what looks like an individual, that this is indeed a living person. Specifically, the user of the system may be in front of a wall on which a portrait, for example, is hung, and the presence of this portrait should not prevent the system from functioning.

The system may thus be designed to detect living people, for example to use infrared illumination in addition to visible illumination to ensure that the individuals viewed are not just masks or photographs, as described in patent CN101404060B, or simply to photograph the infrared spectrum emitted by the individuals.

The system may also comprise a plurality of cameras for checking that the image viewed is indeed in relief, and thus corresponds to that of a person.

It is additionally possible to check that the image is of a living face by checking whether it changes over time. Lastly, it is possible to combine these various types of checks to ensure that what is viewed is not a decoy.

Image Analysis

Image analysis during detection may in particular be performed in order to check that the detection of a reflection of the light which may correspond to the objective of an image-recording device does not correspond to a reflection of the light off the user's eyes, or possibly their glasses.

The detection of an image-recording device may be achieved by detecting a photographic objective of this device, in particular by virtue of the reflection produced thereby.

The detection of the image-recording device may also be achieved by recognizing the device, or even the device model, and potentially consulting a database listing image-recording devices. For example, the presence of an object that resembles a still camera, a video camera or a cellphone is detected, and the predefined action is triggered in the event of such detection. As a variant, the model of the device is recognized, in particular if the device has a camera the objective of which is not obvious, for example a camera positioned behind a phone, tablet or computer screen. The system may have or access a database allowing it to determine whether the model identified is equipped with such a camera. If so, the predefined action is triggered.

The image analysis may further aim to detect whether an unauthorized or unexpected person is entering or about to enter the field of view of the protected information.

Said predefined surveillance area may be illuminated, in particular periodically, by infrared light and the image analysis may comprise the detection of any reflection of this infrared light by an image-recording device. Where applicable, this light may be emitted directionally, and change direction with time.

The image analysis may comprise the detection of the presence of a number of people greater than the number of people authorized to view the object, the information or the person to be protected.

The image analysis may comprise the detection of a number of pairs of eyes in addition to that or those authorized to view the object, the person to be protected or the information, in particular the screen and/or the keyboard. This may make it possible, if desired, not to generate positive detection if the people detected are not looking toward the object, the person or the information to be protected or to provide a gradation of actions depending on whether or not the people detected are looking at the object, the person or the information.

The image analysis may comprise, where applicable, the identification of the one or more people present in the predefined surveillance area and a positive detection may correspond to the detection of a person who is unidentified or identified but listed as unauthorized to view the object, the person or the information, in particular the displayed content or the keyboard.

Where applicable, the definition of the surveillance area results from an analysis of the user's environment, in order to focus the surveillance on the areas where an unwanted viewer might appear. For example, in a first phase, the images are analyzed to determine the occupancy of the space around the user, in order, for example, to first identify invariant parts of the image such as partitions or furniture, and then variable parts of the image such as spaces in or through which people move. Once this analysis has been performed, the detection may focus, for example in a first stage, on the invariant parts in order to detect the potential presence of a reflection due to a concealed image-recording device. The detection may focus, for example in a second stage, on the variable parts of the image in order to detect the arrival of a person or their face pointing in the direction of the displayed content. The frequency of analysis may not be the same for the variable and invariant parts of the image, in order to account for the fact that if a recording device has not been detected in the invariant parts, it is unlikely that such a device will be detected later on. The computing resources may thus focus on just the variable parts of the image, which may make it possible to decrease resource requirement or improve the accuracy of detection in some parts of the user's environment.

In one example, the content to be protected is displayed on a screen in a room and the image analysis may aim to detect the arrival of new people in the room, potentially people unauthorized to view the displayed content. Where applicable, prior analysis of the environment may make it possible to identify the door or corridor via which the one or more people are likely to enter the room, and make it possible to increase the sensitivity of detection or the frequency of detection in the corresponding portion of the image, in order, for example, to more quickly determine whether or not a person is identified as authorized to access the information.

The displayed content may be intended for a predefined user and the predefined action may aim to prevent people other than this user from gaining knowledge of the displayed content. In this case, the displaying of the content may be conditional on the detection of only the authorized user in the field of view of this content. In the absence of detection of the authorized person, the content to be protected automatically stops being displayed; thus, if the user momentarily leaves their station, for example, and is no longer detected, the content immediately stops being displayed.

The situation of the object, in particular of the screen, or of the person, to be protected in an enclosed space may also be controlled. This detection may be effected using one or more lidars, cameras or ultrasound sensors. The displaying of a protected item of information may be restricted to enclosed spaces, thereby preventing the viewing of said information using a telephoto lens which is difficult for the system to detect. Thus the presence of the object or of the information in an enclosed space may be detected and the information may not be displayed on a screen if the screen is not located in an enclosed space or if a door or a window is detected as being open.

The image analysis may aim to generate an item of information informing of the location of the image-recording and/or -transmission device detected, or of the third party unauthorized to access the displayed information. This information is, for example, on a map and accompanied by a photograph of the recording device and of its environment. The image giving the position of the device or of the person may be saved, for later retrieval.

When the person detected is identifiable, for example by consulting a biometric database, their identity may be stored and communicated to an authorized user.

The invention may be useful in the context of a remote school or university exam, the questions being displayed on the screen for the examinee. In this case, it is possible to detect whether a person other than the examinee is looking at the exam questions, or whether an objective is being pointed toward said questions, and in the event of positive detection, to mask the displayed questions and/or to generate an alert.

The image analysis may also be used to determine whether the behavior of the person who is accessing the displayed and protected content meets predefined conditions; in particular, namely when the displayed content is an exam question, it is useful to check that the examinee is not behaving suspiciously which might indicate that they are transmitting the question to a third party.

Thus, the image analysis may comprise the analysis of the movement of the user's fingers to determine whether they are copying information displayed on the screen; if so, an alert may be generated, for example.

The image analysis may also be accompanied by an audio analysis of the sounds in the surveillance area, in particular to check that the user is not reading information off the screen out loud to a hidden third party; to check whether the microphone is indeed active, a predefined sound may be emitted, for example at regular intervals, and the presence of this predefined sound is detected at the same time as other sounds present in the user's environment.

The image analysis may be performed locally, for example by the same device as that which controls the screen on which the content to be protected is displayed, or that which controls the electrochromic glazing behind which the object or the person to be protected is placed; as a variant, the analysis is performed by a remote server.

The method may be made into background task on a device such as a computer or a smartphone, and detection performed regardless of the nature of the information displayed on the screen. As a variant, detection is activated only when an item of information listed as sensitive is displayed, for example an item of information that is displayed during a secure connection to a payment server. Automatically activating detection only for periods when sensitive information is displayed makes it possible to save on machine resources. Where applicable, the system makes it possible to configure the conditions for activating detection, for example when connecting to certain sites, in the case of an https connection, or when a particular user is present.

Predefined Action

The predefined action may comprise ending the displaying of the content to be protected. As a variant or in addition, the predefined action may comprise sending a warning message, in particular by means of sound signal or by displaying it, for example on the screen.

The predefined action may also result in the screen being turned off, or the display being covered or scrambled.

When it is sought to protect an object or a person positioned behind an electrochromic glazing from image capture, the method may comprise opacifying this glazing in the event of detection of an imaging device in the area being monitored, or the emission of one or more dazzling flashes, preferably followed, where applicable, by closing the door or window via which the viewing took place or via which the intruder or the objective detected could come closer to the protected object.

Systems

Another subject of the invention, according to another of its aspects, is a system, in particular for implementing the method according to the invention as defined above, comprising:
- a screen and/or a keyboard,
- at least one camera or a lidar for covering a predefined surveillance area from which a person or an image-recording and/or -transmission device is capable of viewing the screen or the keyboard,
- a processor for automatically detecting, by analyzing images from the camera or from the lidar, the presence of a person and/or of said device in this area and, in the event of positive detection, triggering a predefined action on the displayed content and/or on an action resulting from the use of the keyboard and/or for warning the person of a risk of the keyboard or of the displayed content being viewed.

The predefined action exerted on said action which results from the use of the keyboard is, for example, the blocking of any subsequent transaction made using the information entered via the keyboard, thus forcing the user to change password or code to make any further transactions.

Another subject of the invention, according to another of its aspects, is a system, in particular for implementing the method according to the invention as defined above, comprising:

- an electrochromic glazing behind which an object or a person to be protected may be present,
- at least one camera or a lidar for covering a predefined surveillance area from which an image-recording and/or -transmission device is capable of viewing the object or the person through the electrochromic glazing,
- a processor for automatically detecting, by analyzing images from the camera or from the lidar, the presence of said device in this area and, in the event of positive detection, triggering the opacification of the glazing.

Another subject of the invention, according to another of its aspects, is a system, in particular for implementing the method according to the invention as defined above, in order to protect an object or a person from image capture by an image-recording and/or -transmission device,

- at least one camera or a lidar for covering a predefined surveillance area from which an image-recording and/or -transmission device is capable of viewing the object or the person,
- a processor for automatically detecting, by analyzing images from the camera or from the lidar, the presence of said device in this area and, in the event of positive detection, generating a predefined action, in particular automatically preventing the image capture, and/or an alert.

Computer Program Product

Another subject of the invention is a computer program product for implementing any one of the exemplary methods according to the invention, as defined above.

Thus, a subject of the invention is, in particular, a computer program product, comprising, on a data medium, a stored program that has a code which, when it is executed on a processor of a system, for example a computer or a smartphone, comprising or connected to:

- a screen and/or a keyboard,
- at least one camera or a lidar for covering a predefined surveillance area from which a person or an image-recording and/or -transmission device is capable of viewing the screen or the keyboard, results in the processor:
- automatically detecting, by analyzing images from the camera or from the lidar, the presence of a person and/or said device in this area and, in the event of positive detection,
- triggering a predefined action on the displayed content and/or on an action resulting from the use of the keyboard and/or for warning the person of a risk of the keyboard being viewed.

BRIEF DESCRIPTION OF THE DRAWINGS

The invention may be better understood from reading the following detailed description of non-limiting exemplary implementations thereof, and from examining the appended drawing, in which.

DETAILED DESCRIPTION

Figure 1:
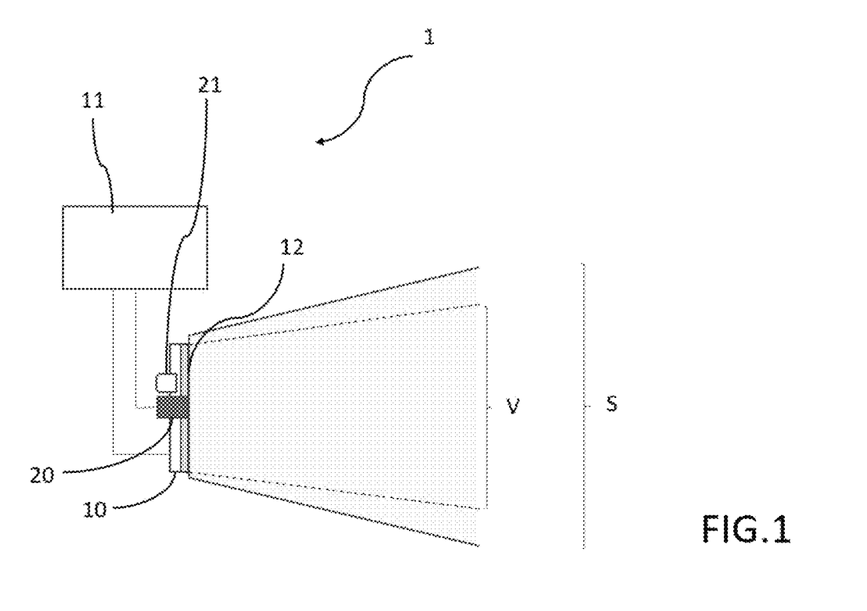
FIG. 1 schematically and partially shows an exemplary system for implementing the method according to the invention.

FIG. 1 shows an exemplary system 1 according to the invention, comprising a screen 10 on which is displayed information that it is sought to protect from unauthorized viewing.

The screen 10 is connected to or forms part of an electronic device 11 which may be of any type, for example a computer or dual reader as defined in patent Ser. No. 10/643,198 from the same inventor, among other possibilities.

The system 1 also comprises a camera 20 connected to the electronic device 11 or which forms part thereof.

The information displayed on the screen 10 is visible over a certain viewing angle V which results, in the example in question, from the use of an optical device 12 known per se, which limits the field of view. This device 12 is, for example, a privacy filter stuck to the screen, which comprises an array of microlouvers to block side views of the screen 10.

The camera 20 may monitor an area S which corresponds to a wider field than the field V.

At least one light source 21 emitting in the visible or in the IR may be associated with the camera 20 in order to facilitate detection of reflections from image-recording devices, the presence of which is not wanted.

The electronic device 11 is designed to process the images delivered by the camera 20 in order to detect the presence of third parties other than the user and/or of image-recording and/or -transmission devices which are unauthorized.

This image processing may be performed conventionally using trained neural networks, for example.

Figure 2:
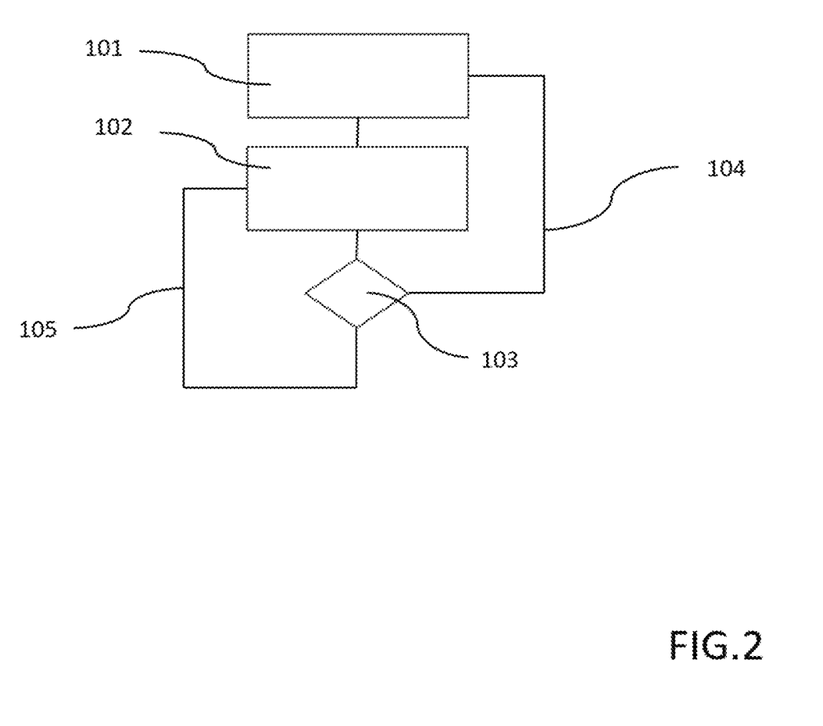
FIG. 2 illustrates steps of an exemplary method according to the invention.

FIG. 2 illustrates an exemplary method according to the invention that may be implemented within the system 1.

Step 101 corresponds to the displaying of information on the screen 10, at least some of which is reserved for the use of one or more users of the system.

Parallel with the displaying of the information to be protected on the screen 10, or in alternation therewith, the camera 20 views, in step 102, the area being monitored. In step 103, the images are analyzed with a view to detecting the presence of an image-recording and/or -transmission device directed toward the screen or of an unauthorized third party.

The detection of the presence of an image-recording and/or -transmission device is based, for example, on detecting the reflection of the light from the source 21 off its objective, in a manner known per se; spy-camera detectors are available to the public from, for example, Brickhouse Security referenced as "Portable, handheld hidden camera detector". It may also employ object recognition.

The presence of a third party may be detected, for example, simply by detecting and counting the number of people present in the area being monitored. For example, if access to the information displayed on the screen is intended for just one person positioned in front of the screen, detection will be based on the potential presence of another person, without seeking to identify them.

The detection of a person in the image may be based on a conventional algorithm using trained neural networks.

If the result of the analysis performed in step 103 is positive, then a predefined action 104 is effected, for example on the displaying of the information, as illustrated. For example, the displaying of the information may be stopped and an alert message displayed instead.

In the absence of positive detection, displaying may continue as normal, along with the monitoring of said area.

Figure 3:
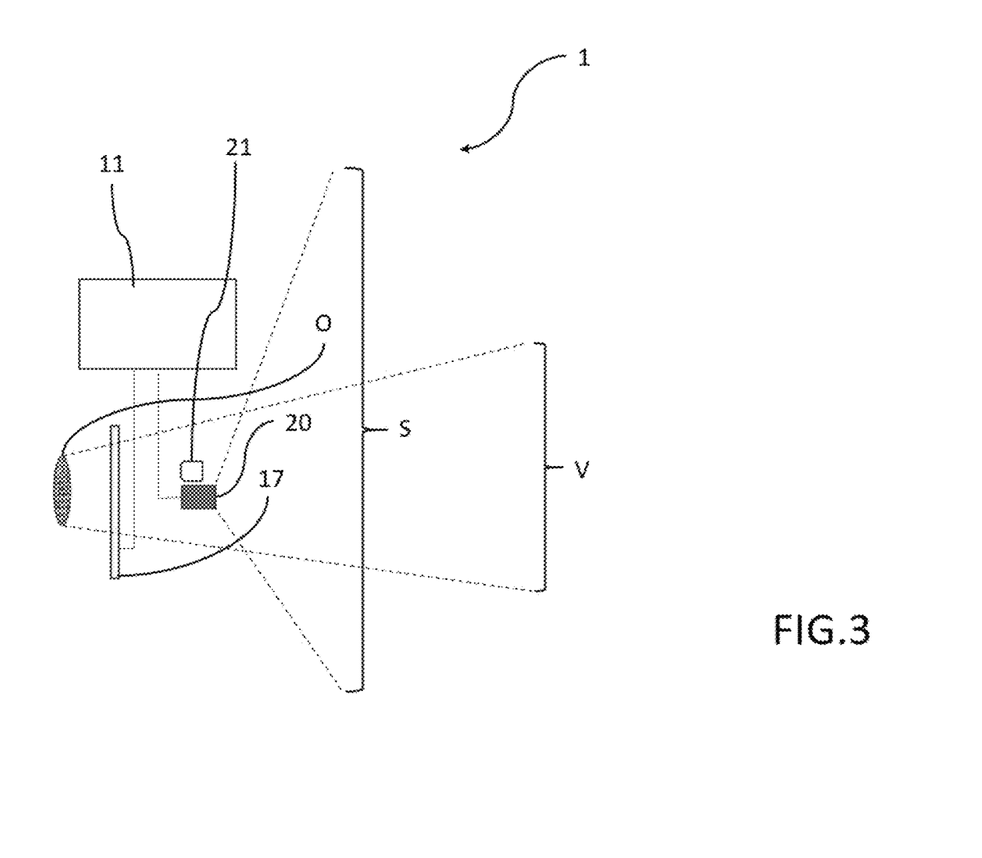
FIG. 3 is a view analogous to FIG. 1, of a variant system according to the invention.

FIG. 3 shows a variant of system 1 according to the invention, for protecting a person or an object O from the recording and/or transmission of images thereof.

In this example, the system 1 comprises an electrochromic glazing 17, capable of being opacified very quickly in response to a command from the electronic device 11, behind which the person or the object O is positioned.

Analyzing the images taken by the camera 20 makes it possible to detect the presence of an image-recording device in the area being monitored, i.e. in front of the glazing 17, for example a still camera or a cellphone taken out of a pocket or bag; in the event of positive detection, the device 11 causes the near-instant opacification of the glazing 17, thereby making image capture impossible. An alert message may also be generated, where applicable.

In one variant, not illustrated, the glazing 17 is absent. In this case, an alert is generated to warn the person to be protected or a guard of the object to be protected.

Of course, numerous variants of the invention may be made without departing from the scope thereof.

For example, the analysis of the images delivered by the camera 20 may comprise identification of the people present, for example by means of facial recognition.

In this case, the system 1 may act on the display if a person who appears in the viewing field of the camera 20 does not feature among the people listed as authorized to access the displayed information.

It is possible to use a plurality of cameras 20 to extend the area being monitored or to have greater sensitivity in detection, and/or to check whether the people detected are indeed people in relief, so as to prevent the risk of false positives through confusion with photographs of people, for example.

Similarly, it is possible to use a plurality of light sources, whether visible or IR.

It is possible to use one or more lidars (Light Detection and Ranging) instead of cameras to perform the optical detection of people or image-recording and/or -transmission devices, or to combine both for greater accuracy and to decrease the risk of false positives.

The screen 11 may also be another hardware device, for example a touchscreen or a keyboard, and it may be sought to prevent the unauthorized viewing of a code entered into same. In the case of protecting an input keyboard, the location of the numbers or characters that have to be selected is preferably variable, or changed randomly, during or between two inputs.

The one or more cameras used to control the area being monitored may be used, where applicable, for other security functions such as user facial recognition.

The invention claimed is:

1. Method for automatically protecting an object, a person, an action or an item of visual information from a risk of unwanted viewing of this object, person, action or information by an image-recording and/or -transmission device, this method comprising the steps of:
   automatically detecting, by analyzing images from at least one lidar (Light Detection and Ranging) or from a camera arranged so as to cover a predefined surveillance area, the presence of said device in this area or nearby, the predefined surveillance area corresponding at least to an area from which said device is capable of viewing the object, the person, the action or said information; and
   wherein the image analysis comprises the detection of a number of people greater than the number of people authorized to view a material;
   in the event of positive detection, triggering a predefined action that automatically prevents said viewing;
   the object, the person, the action or the information being viewable over a given viewing field and the predefined surveillance area covering a wider field.

2. Method according to claim 1, the object being a screen equipped with a privacy filter that decreases the field of view of a content displayed on the screen.

3. Method according to claim 1, the predefined action comprising an order to opacify an electrochromic glazing behind which the object or the person to be protected is positioned, and through which the object or the person to be protected can be viewed from the surveillance area.

4. Method according to claim 1, said at least one camera being fixed relative to the object.

5. Method according to claim 1, wherein said predefined area is illuminated by an infrared light and wherein the image analysis comprises the detection of any reflection of this infrared light by an image-recording and/or -transmission device.

6. Method according to claim 1, wherein the image analysis comprises the detection of a number of pairs of eyes in addition to that or those authorized to view the object, the person, the action or the information to be protected.

7. Method according to claim 1, wherein the image analysis comprises the identification of one or more people present in the predefined surveillance area and wherein a positive detection corresponds to the detection of a person who is unidentified or identified but listed as unauthorized to view the object, the action or the information.

8. Method according to claim 1, wherein the information to be protected is displayed on a screen in a room and the image analysis aims to detect the arrival of new people in the room, potentially people unauthorized to view the displayed information.

9. Method according to claim 1, wherein the displayed information is intended for a predefined user and the predefined action aims to prevent people other than this user from gaining knowledge of a displayed information, the displaying of the content being conditional on the detection of only an authorized user in the field of view of this content, and in the absence of detection of the authorized person, the content to be protected automatically stops being displayed.

10. Method according to claim 1, wherein the presence of the object or of the information in an enclosed space is detected.

11. Method according to claim 1, wherein the predefined action comprises the stopping of the displaying of the information to be protected.

12. System for implementing the method according to claim 1, comprising:
   a screen and/or a keyboard;
   at least one camera or a lidar for covering a predefined surveillance area from which an image-recording and/or -transmission device is capable of viewing the screen or the keyboard; and
   a processor for automatically detecting, by analyzing images from the camera or from the lidar, the presence of said device in this area and, in the event of positive detection, triggering a predefined action on a displayed content and/or on an action resulting from the use of the keyboard and/or for warning a person of a risk of the keyboard being viewed.

13. System for implementing the method as defined above in claim 1, comprising:
- an electrochromic glazing behind which an object or a person to be protected may be present; and
- at least one camera or a lidar for covering a predefined surveillance area from which an image-recording and/or -transmission device is capable of viewing the object or the person through the electrochromic glazing; and
- a processor for automatically detecting, by analyzing images from the camera or from the lidar, the presence of said device in this area and, in the event of positive detection, triggering the opacification of the glazing.

14. System for implementing the method according to claim 1, in order to protect an object or a person from image capture by an image-recording and/or -transmission device,
- at least one camera or a lidar for covering a predefined surveillance area from which an image-recording and/or -transmission device is capable of viewing the object or the person; and
- a processor for automatically detecting, by analyzing images from the camera or from the lidar, the presence of said device in this area and, in the event of positive detection, generating a predefined action that automatically prevents image capture.

* * * * *